(12) United States Patent
Jeyaraman et al.

(10) Patent No.: US 10,791,079 B2
(45) Date of Patent: Sep. 29, 2020

(54) MULTI-TIERED ANTI-SPAMMING SYSTEMS AND METHODS

(71) Applicant: Twitter, Inc., San Francisco, CA (US)

(72) Inventors: Raghav Jeyaraman, Sunnyvale, CA (US); Arjun Maheswaran, Mountain View, CA (US); Erdong Chen, Redwood City, CA (US)

(73) Assignee: Twitter, Inc., San Francisco, CA (US)

( * ) Notice: Subject to any disclaimer, the term of this patent is extended or adjusted under 35 U.S.C. 154(b) by 115 days.

(21) Appl. No.: 16/208,515

(22) Filed: Dec. 3, 2018

(65) Prior Publication Data

US 2019/0190866 A1 Jun. 20, 2019

Related U.S. Application Data

(63) Continuation of application No. 14/575,669, filed on Dec. 18, 2014, now Pat. No. 10,148,606.

(60) Provisional application No. 62/028,565, filed on Jul. 24, 2014.

(51) Int. Cl.
*G06F 15/167* (2006.01)
*H04L 12/58* (2006.01)
*G06Q 10/10* (2012.01)

(52) U.S. Cl.
CPC ........... *H04L 51/12* (2013.01); *G06Q 10/107* (2013.01); *H04L 51/32* (2013.01)

(58) Field of Classification Search
CPC ........ H04L 51/12; H04L 51/32; G06Q 10/107
See application file for complete search history.

(56) References Cited

U.S. PATENT DOCUMENTS

| 6,199,102 | B1 | 3/2001 | Cobb | |
|---|---|---|---|---|
| 7,293,063 | B1 | 11/2007 | Sobel | |
| 7,899,866 | B1 | 3/2011 | Buckingham | |
| 8,799,987 | B2 | 8/2014 | Stein et al. | |
| 2005/0091320 | A1* | 4/2005 | Kirsch | H04L 51/12 709/206 |
| 2006/0026246 | A1 | 2/2006 | Fukuhara | |
| 2006/0168031 | A1 | 7/2006 | Cai | |
| 2007/0016641 | A1 | 1/2007 | Broomhall | |
| 2009/0187987 | A1 | 7/2009 | Ramarao et al. | |
| 2010/0082749 | A1 | 4/2010 | Wei et al. | |

(Continued)

OTHER PUBLICATIONS

Bos, "Identities on Twitter," Master Thesis submitted to University of Amsterdam (2012).

(Continued)

*Primary Examiner* — Chris Parry
*Assistant Examiner* — Stephen J Houlihan
(74) *Attorney, Agent, or Firm* — Fish & Richardson P.C.

(57) ABSTRACT

Embodiments are provided for reducing unwanted messages or spam within a real-time social networking service. According to certain aspects, a synchronous analysis module may operate in coordination with an asynchronous analysis module. Each of the synchronous analysis module and the asynchronous analysis module analyzes an incoming message from a user account to determine whether the incoming message has characteristics of spam, whereby the synchronous analysis is at a lower latency than the asynchronous analysis. The asynchronous analysis is afforded the ability to identify certain spam characteristics that the synchronous analysis may identify during its lower latency analysis.

21 Claims, 6 Drawing Sheets

(56) References Cited

U.S. PATENT DOCUMENTS

| | | | |
|---|---|---|---|
| 2011/0294478 | A1 | 12/2011 | Trivi et al. |
| 2011/0314106 | A1 | 12/2011 | Bansal et al. |
| 2012/0030293 | A1 | 2/2012 | Bobotek |
| 2012/0054858 | A1 | 3/2012 | Andersen et al. |
| 2013/0145418 | A1 | 6/2013 | Stein et al. |
| 2014/0040386 | A1 | 2/2014 | Somani |
| 2016/0028673 | A1 | 1/2016 | Jeyaraman et al. |

OTHER PUBLICATIONS

Boshmaf et al., "Design and Analysis of a Social Botnet," Computer Networks, 57(2):556-578 (2013).
Boshmaf et al., "Key Challenges in Defending Against Malicious Socialbots," 5th USENIX Workshop on Large-Scale Exploits and Emergent Threats (2012).
Boshmaf et al., "The Socialbot Network: When Bots Socialize for Fame and Money," ACSAC ProceedinQs of the 27th Annual Computer Security Applications Conference, pp. 93-102 (2011).
Cao et al., "Aiding the Detection of Fake Accounts in Large Scale Social Online Services," 9th USENIX Symposium on Networked Systems DesiQn and Implementation, San Jose, CA (2012).
Cao et al., "Uncovering Large Groups of Active Malicious Accounts in Online Social Networks," Proceedings of the 2014 ACM SIGSAC Conference on Computer and Communications Security (2014).
Dewan et al., "Facebook. Because Studying Events and Spammers on Twitter is too Mainstream," (2014).
Dewan et al., "Spam Identification on Facebook During Events," ACM Conference on Online Social Networks (2014).
Dickerson et al., "Using Sentiment to Detect Bots in Twitter: Are Humans More Opinionated Than Bots?" IEEE/ACM International Conference on Advances in Social Networks Analysis and Mining (ASONAM) (2014).
Faghani et al., "Malware Propagation in Online Social Networks," 4th International Conference on Malicious and Unwanted Software (MALWARE) (2009).
Huang, "Understanding Online Malicious Behavior: Social Malware and Email Spam," Dissertation submitted to University of California, Riverside (2013).
International Search Report and Written Opinion, International Application No. PCT/US2015/041894, dated Oct. 8, 2015.
Lupher et al., "Detecting Spam on Social Networkina Sites: Related Work," (2011).
Lupher et al., "Feature Selection and Classification of Spam on Social NetworkinQs Sites," (2012).
Narayanan et al., "A Critical Look at Decentralized Personal Data Architectures," Proceedings of Computer Research Repository (2012).
Rahman et al., "Efficient and Scalable Socware Detection in Online Social Networks," 21st USENIX Security Symposium (2012).
Rahman, "Detecting Social Malware and its Ecosystem in Online Social Networks," Dissertation submitted to University of California, Riverside (2012).
Stein et al., "Facebook Immune System," EuroSys Social Network Systems (2011).
Sun et al., "The Devil is in the (Implementation) Details: An Empirical Analysis of OAuth SSO Systems," Proceedings of the 2012 ACM Conference on Computer and Communications Security (2012).
Wang et al., "A Social-Spam Detection Framework," Proceedings of the 8th Annual Collaboration, Electronic Messaaina, Anti-Abuse and Spam Conference (2011).
Wang et al., "SPADE: A Social-Spam Analytics and Detection Framework," Social Network Analysis and Mining (2014).
Wilson, "Battling Spam and Sybils on the Social Web," Dissertation submitted to University of California, Santa Barbara (2012).
Yang et al., "Uncovering Social Network Sybils in the Wild," Proceedings of the ACM SIGCOM Conference on Internet Measurement, pp. 259-268 (2011).
Zhu et al., "Discovering Spammers in Social Networks," Proceedings of the 26th AAAI Conference on Artificial Intelliqence (2012).

* cited by examiner

MULTI-TIERED ANTI-SPAMMING SYSTEMS AND METHODS

CROSS-REFERENCE TO RELATED APPLICATIONS

This application is a continuation application of, and claims priority to, U.S. patent application Ser. No. 14/575,669, filed on Dec. 18, 2014, now U.S. Pat. No. 10,148,606, which claims the benefit of U.S. Provisional Application No. 62/028,565, filed Jul. 24, 2014, which is incorporated by reference herein in its entirety.

BACKGROUND

Electronic spamming is the use of electronic messaging systems to indiscriminately send unsolicited or unwanted messages, or "spam." The act of spamming can be economically viable to spammers because of the low operating costs as well as the difficulty to hold spammers accountable for their activities. The costs, such as pollution of the user experience, lost productivity, and fraud, are borne by service providers and ultimately by end users.

Some content sharing services are uniquely affected by spam in that spammers may directly interact with users via usernames or handles that are readily available and accessible. For example, spammers who use Twitter® can spam users by replying to a "Tweet®" that a user posts, by including usernames in a Tweet® that the spammers themselves post, and/or by direct message. Further, spammers have access to histories or streams of users' posts. The problem may be exacerbated when a content sharing service opens its application programming interface (API) to developers. Additionally, because of the real-time content creation and consumption nature of some content sharing services, an anti-spam system must be able to react with lower latency and at scale to be effective.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
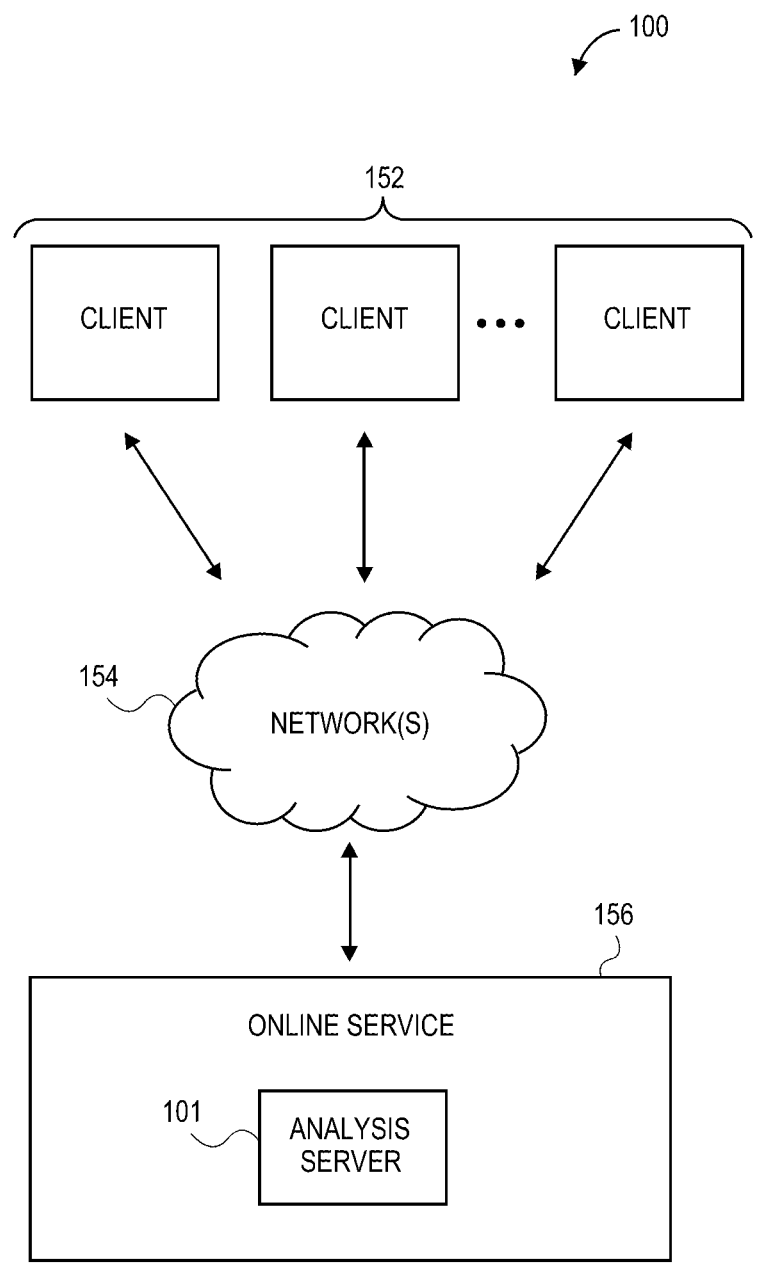
FIG. 1 illustrates a general architecture of a system enabling access to an online service by a plurality of users, in accordance with some embodiments.

According to the present embodiments, an architecture as well as various built-in systems and methods of limiting or reducing undesired messages (generally, "spam") are disclosed. The systems and methods may be associated with online services that support user-generated content, such as various social networking services. Because user information (e.g., usernames, handles, etc.) is easily accessible on social networking services, users who generate spam, or "spammers," may easily target users by sending unwanted content directly or indirectly to the users. Although various embodiments of the invention are described with respect to a social networking service, the functionality described is applicable to other types of content sharing platforms and services with similar properties and constraints.

Many of the systems and methods disclosed herein are particularly impactful when implemented in real-time or near-real-time services such as Twitter®. Real-time services enable a user to create and transmit messages in real time, whereby any recipient (e.g., "followers" of the user's account) may view the content upon write or publication. The message may include text, image, video, data, and/or other content, in accordance with various embodiments. Further, real-time messaging services enable two or more users to communicate during concurrent sessions within the services. In contrast, when a user creates content in a non-real time service, a more significant delay exists between when the user transmits the content and when a recipient can view the content. Further, live communication between users during concurrent communication sessions is not always possible or convenient in non-real-time platforms.

Accordingly, real-time services often maintain latency requirements that are different from those of non-real-time services. In particular, real-time services generally have lower latency requirements that allow for imperceptible or minimal delays between an input being processed and the corresponding output, while non-real time services are afforded higher latency delays between an input being processed and the corresponding output (where delay perceptibility is not as important).

Spam reduction and/or elimination is important, if not imperative, for both real-time and non-real time services. Because of the complexity of attacks by spammers, anti-spamming systems and techniques are often complex and require large processing capabilities (i.e., may be afforded a higher latency requirement). However, as discussed above, features of real-time services may not be effective and/or users may experience too long of a delay when higher latency anti-spamming systems and techniques are implemented. Accordingly, the present systems and methods describe a multi-tiered anti-spamming platform that efficiently and effectively limits spam while preserving real-time features and meeting the lower latency requirements thereof.

The multi-tiered platform supports both a synchronous analysis portion and an asynchronous analysis portion that functions in coordination with the synchronous analysis portion. In such a system, the asynchronous portion may analyze large databases and implement complex machine learning algorithms or models that would otherwise introduce unacceptable latency into a real-time system. The asynchronous portion may execute these higher latency models or algorithms to generate or identify characteristics that may be examined by the synchronous portion with lower latency. For example, the asynchronous portion may analyze, at a higher latency, an account's activity history within an online service to identify characteristics indicative of a spam generator. If such characteristics are present, the asynchronous portion may label the account as a potential spam generator. During an analysis of a message authored by the account, the synchronous portion can query an account repository (not shown) for the potential spam generator label, thus identifying the spam at a lower latency and avoiding the higher latency of the asynchronous analysis.

Generally, a "synchronous analysis" is used for lower latency analyses while an "asynchronous analysis" is used for higher latency analyses. Further, a synchronous analysis is a dependency for broadcasting or otherwise processing a message (e.g., the synchronous analysis of the message must be completed before the message is broadcast), while an asynchronous analysis is not a dependency for broadcasting or otherwise processing a message (e.g., there is no requirement for the asynchronous analysis of the message to complete before the message is broadcast).

The systems and methods aim to reduce and limit the amount of spam that the user of the online service sees while ideally resulting in zero false positives. In operation, various event data is received from various distributed systems of an online service. The systems and methods synchronously and asynchronously inspect the received data according to a set of rules and characteristics thereof, whereby the rules and characteristics include conditions for deciding whether to act on an event as well as actions that dictate how to handle the event. The net effect results in content that matches a condition getting denied from being broadcast. For example, a spammer on Twitter® is denied from sending a "Tweet®" if content in the Tweet® matches a condition associated with a denial action.

The systems and methods offer numerous benefits to online services and users thereof. In particular, the systems and methods are configured to limit channels for spammers (users or computers) to disseminate spam, thus reducing the amount of spam that is broadcast. Further, for any spam that is created, the systems and methods reduce the amount of time the spam is visible or available on the service. Additionally, the systems and methods enable engineers to effectively deduce how certain spam is able to not be detected by the rules. The engineers may therefore quickly create new rules, thus reducing the reaction time necessary to alleviate or mitigate new spam attacks. This is especially important because spammers are usually able to work around established system defenses. Moreover, the systems and methods are configured to handle stringent latency requirements of real-time features. It should be appreciated that other benefits to the systems and methods are envisioned.

FIG. 1 illustrates a general system architecture of a system 100 capable of implementing and supporting the described embodiments. The system 100 includes a plurality of clients 152 configured to access an online service 156 and features thereof via one or more networks 154. Generally, the online service 156 may be a real-time online service that is accessible by a plurality of users having respective accounts with the online service 156 or otherwise accessing the online service 156. The online service 156 may support social networking features by enabling the users to communicate with each other in real time by sending messages. For example, the online service 156 may be a social networking and microblogging service. The online service 156 may include an analysis server 101 configured to facilitate various functionalities of the described systems and methods. Generally, the analysis server 101 is a dedicated computer machine, workstation, or the like, including any combination of hardware and software components.

Generally, the network 154 may be any type of wired or wireless local area network (LAN), wide area network (WAN), or the like. For example, the network 154 may be the Internet, or various corporate intranets or extranets. In embodiments, each of the plurality of clients 152 is a dedicated portable or non-portable electronic device including any combination of hardware and software components that may be accessible by a user. In particular, a user having an account with the online service 156 (or otherwise accessing the online service 156) may use the respective client 152 to access the online service 156 and the features thereof. The social networking service may allow access to unregistered users, in which case a temporary or placeholder account is generated for the user. In some embodiments, one of the clients 152 may operate automatically without intervention from a user but perform actions under an account of the user.

Generally, the broadcasting of a message in a real-time broadcast service is different from the communication of a message in a point-to-point communication platform such as e-mail (which, at least in some cases, may be a non-real-time service). In particular, in a real-time broadcast service, an account typically has a "stream" or "feed" in which content (e.g., messages, photos, videos, links, etc.) is displayed for users of the account to view or select. Typically, the account is "connected to," "following," or otherwise associated with other accounts of the real-time service. Such an association may be represented by a connection graph (e.g., an asymmetric graph data structure). When content that is produced by an account is broadcast within the real-time service, the service will automatically identify the recipient accounts (e.g., by identifying the followers of the account from a connection graph), and the content will appear on the stream or feed of the recipient accounts. In contrast, in a point-to-point communication platform, messages are communicated directly between accounts. Further, the sending account must explicitly specify the recipient account before sending the message, whereby only the recipient account has access to the message.

In a real-time broadcast service, the content may appear on the stream or feed in chronological (or reverse-chronological) order according to when the content is broadcast, or appears in an order according to various algorithms (e.g., popularity of the content). For example, in a reverse-chronological stream, the content is ordered, from top to bottom, from the most recent post to the least recent post. Therefore, the real-time nature of the service as well as the layout of the stream or feed encourages users to periodically check or update their respective streams or feeds so that the users may view the most up-to-date and/or trending/viral content. For example, a user may wish to view the most up-to-date information regarding a breaking news event, where the information is produced by one or more media outlets that the user is following. Because of these and other characteristics, a real-time broadcast communication platform is more difficult to scale and more difficult to filter for spam than a point-to-point communication platform.

Figure 2:
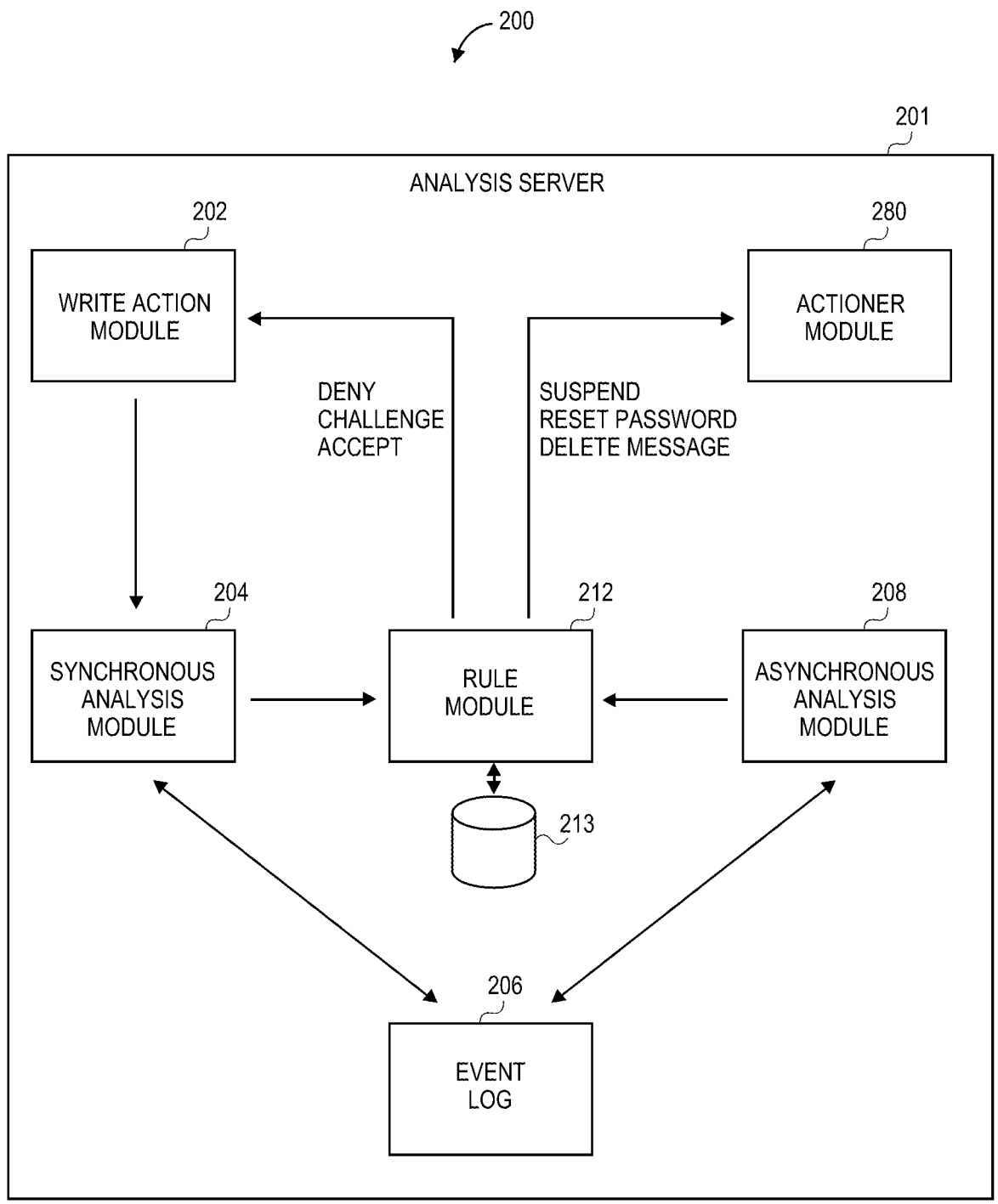
FIG. 2 illustrates a system included in an online service including components configured to limit unwanted messages, in accordance with some embodiments.

FIG. 2 illustrates a general system architecture of a multi-tiered anti-spamming system 200. In embodiments, the system 200 may be associated with the online service 156 as described with respect to FIG. 1. The components of the system 200 may be implemented on an analysis server 201 such as the analysis server 101 as described with respect to FIG. 1. Although FIG. 2 illustrates the components of the system 200 as being implemented on a singular server, it should be appreciated that different components or groups of components may be implemented on different servers.

The system 200 supports a synchronous analysis module 204 in combination with an asynchronous analysis module 208. Each of the synchronous analysis module 204 and the asynchronous analysis module may retrieve a set of rules from a rule module 212, where the set of rules are stored on hardware such as a database 213 (e.g., solid state drives (SSDs), platter storage such as hard disk drives, or other memory). Generally, the set of rules may be a set of machine learning algorithms or models embodied in computer-readable form that, when used to analyzed received content, may indicate or detect unwanted messages or spam. Because of the complexity of some of the set of machine learning algorithms, a synchronous analysis of the set of rules according to a lower latency requirement may not be possible or desirable. Accordingly, the set of rules may have an associated set of characteristics (such as various metrics or labels) that may indicate undesired messages or may indicate that an account or computer is attempting to write or broadcast undesired messages. Because of the relative lower complexity of the set of characteristics, a synchronous analysis within a real-time platform according to a lower latency requirement is possible.

As illustrated in FIG. 2, the synchronous analysis module 204 communicates with a write action module 202 from which content such as communications, messages, and/or the like is received. For example, the write action module 202 receives a message created or generated by a user or a computer (e.g., a Tweet®, direct message, reply, etc.) and sends the message to the synchronous analysis module 204. After receiving the message, the synchronous analysis module 204 may analyze the message to determine whether the message includes characteristics indicative of spam. In analyzing the message, the synchronous analysis module 204 may apply one or more rules retrieved from the rule module 212. In particular, some of the rules may have associated characteristics that are accessible via a lookup table or other data structure. Because the synchronous analysis module 204 operates on a synchronous path, the analysis meets lower latency requirements.

If the synchronous analysis module 204 determines that the message includes characteristics indicative of spam (i.e., one of the rules or characteristics from the rule module 212 is triggered), the synchronous analysis module 204 may deny the message write. In some cases, the synchronous analysis module 204 may outright deny the message write; and in other cases, the synchronous analysis module 204 may interface with the write action module 202 to challenge the message write via various countermeasures such as a further verification (e.g., a CAPTCHA). If the synchronous analysis module 204 determines that the content does not include characteristics indicative of spam, the synchronous analysis module 204 may allow the message write (e.g., by the analysis server 201 broadcasting the message) or otherwise not deny or challenge the message. In embodiments, the analysis server 201 may support a process (e.g., computer-executable instructions) for broadcasting messages.

When the synchronous analysis module 204 allows a write of a message, the analysis server 201 may initiate the broadcast process where the end result is that the message is broadcast within the online service 256. For example, if the message is originated by Account A, then the analysis server 201 allows the message to be broadcast out to the timelines or streams of any followers of Account A. In some cases, if the message is a "mention" identifying one or more other accounts, (e.g., Account B), then then analysis server 201 may send a push notification to Account B as well as include the mention in an "activity" or "notification" section of Account B's timeline (which may require an additional spam check). In another example, if Account A newly "follows" Account B, then the analysis server 101 may create a new follow edge between Account A and Account B as well as send a notification of the follow to the activity or notification section of Account B's timeline (which may also require an additional spam check). Additionally, if Account A is a placeholder account for a new user signing up for the service, then the analysis server 201 may create a new account for that user. It should be appreciated that additional actions responsive to the synchronous analysis are envisioned, where one or more of these actions may be performed as part of the broadcast process. As a result, in one or more embodiments, a message that begins the broadcast process may be restricted by the asynchronous analysis module 208 prior to being broadcast or prior to completely propagating through the social network.

Subsequent to or concurrently with the analysis by the synchronous analysis module 204, the asynchronous analysis module 208 may also analyze the content received from the user according to one or more rules from the rule module 212. In some embodiments, the asynchronous analysis module 208 may perform its analysis upon the synchronous analysis module 204 allowing the content to be broadcast. In contrast to the analysis by the synchronous analysis module 204, the asynchronous analysis module 208 may analyze the message according to rules that require more processing capacity (and therefore require a higher latency), such as various complex machine learning algorithms or models. In addition to allowing or denying the message based on the rule analysis, the asynchronous analysis module 208 may also identify certain characteristics or labels resulting from the analysis. For example, the asynchronous analysis module 208 may identify how many instances a certain account has been "blocked" over a particular time frame. The asynchronous analysis module 208 may update a lookup table or other data structure with the identified characteristics, which the synchronous analysis module 204 may examine during the real time analysis. Thus, the system 200 supports a feedback loop between the higher latency analysis by the asynchronous analysis module 208 and the lower latency analysis by the synchronous analysis module 204.

As an example of a contrast in processing latency, one of the rules of the set of rules may specify that if a number of "Tweets" sent from the same account in a given time frame exceeds a threshold amount, then that account may be denied from sending a subsequent Tweet®. Because the rule requires multiple queries which in combination may exceed the latency tolerance of real time systems, analyzing content according to the rule may be afforded a higher latency which requires use of the asynchronous analysis module 208. While asynchronously analyzing content generated by example Account A according to the rule, the asynchronous analysis module 208 may characterize or "flag" Account A as exceeding the threshold amount of Tweets, and may reflect the usage violation by sending a message to Account A or by associating a flag with Account A in an account repository. When new content is received from Account A, the synchronous analysis module 204 may examine the account repository to determine in real time (i.e., with lower latency) that Account A should be prevented from broadcasting content and may accordingly deny the new content in real time.

Each of the synchronous analysis module 204 and the asynchronous analysis module 208 may interface with an actioner module 210 capable of facilitating various actions based on the respective analyses of the synchronous analysis module 204 and the asynchronous analysis module 208. For example, either of the synchronous analysis module 204 or the asynchronous analysis module 208 may request for the actioner module 210 to delete a message, require the user to reset an account password, suspend the account of the user, or perform other actions. In embodiments, the action performed by the actioner module 210 may vary based on the outcome of the respective analyses of the synchronous analysis module 204 and the asynchronous analysis module 208.

Each of synchronous analysis module 204 and the asynchronous analysis module 208 may also interface with an event log 206. According to embodiments, each of the synchronous analysis module 204 and the asynchronous analysis module 208 may update the event log 206 with results from the respective analyses. Further, each of the synchronous analysis module 204 and the asynchronous analysis module 208 may update the event log 206 with actions taken by the write action module 202 and the actioner module 210, as well as actions with the received messages themselves. Additionally, at least the asynchronous analysis module 208 may update the event log 206 with characteristics identified from analyzing content according to the set of rules from the rule module 212, such that the synchronous analysis module 204 may retrieve the characteristics from the event log 206 during its content analysis.

The analysis server 201 can also enable users (e.g., engineers) to interface with the various components to examine the results of the analyses. In some cases, a message may circumvent the synchronous and asynchronous analyses without being flagged as undesired or spam. In these cases, the message may not trigger one of the set of rules or characteristics thereof and may represent a new form of spam attack. Accordingly, the users may assess features of the message and determine a new rule to combat the new form of spam attack. The users may create or program the rule and add the rule to the database 213 for use in the synchronous and asynchronous analyses to prevent a subsequent attack of the same form. It should be appreciated that the analysis server 201 may automatically, without user interaction, facilitate the identification of the new forms of spam attack as well as the creation and implementation of new rules to combat the new forms of spam attack.

Figure 3:
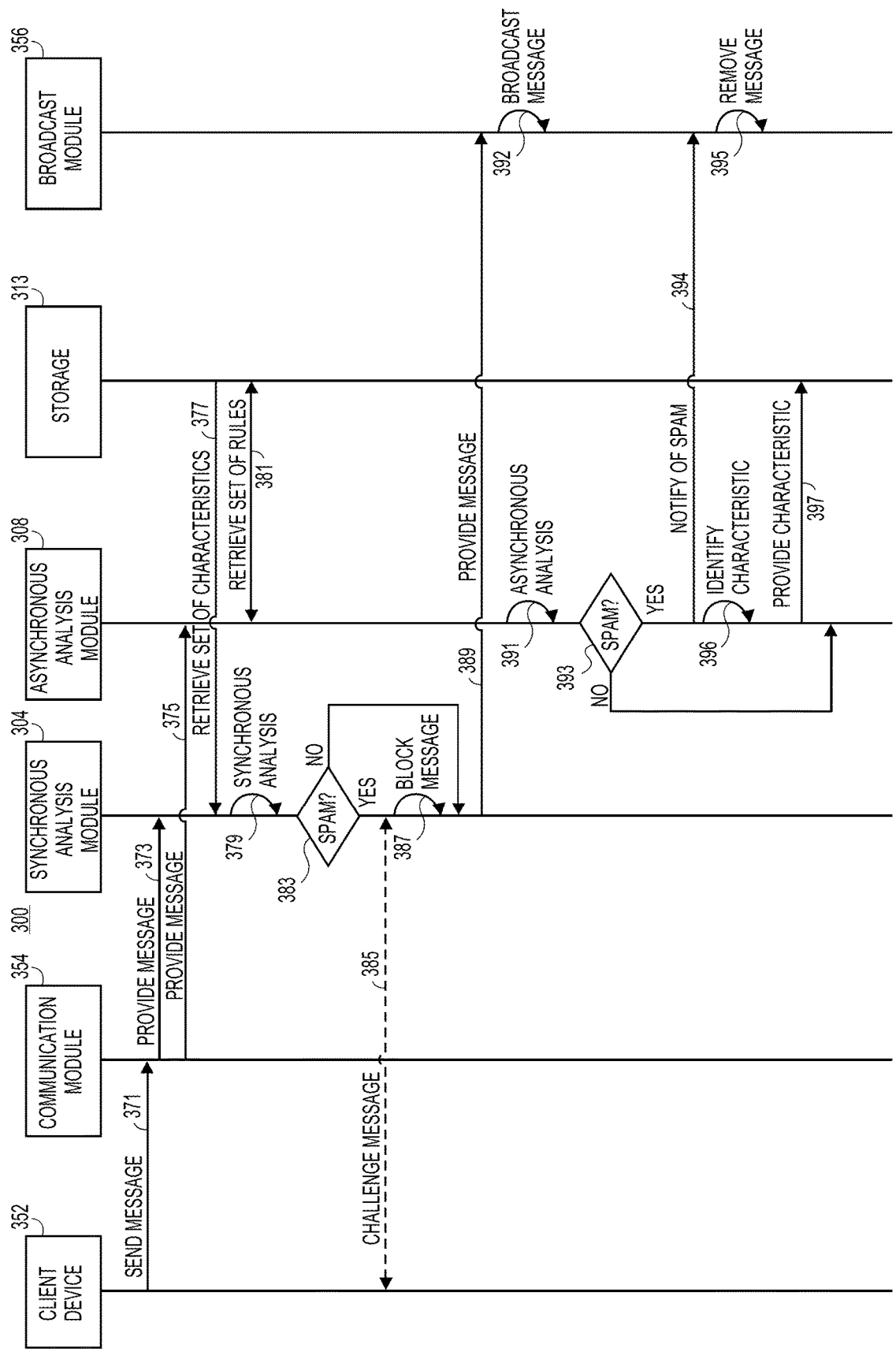
FIG. 3 illustrates a signal diagram of a technique for limiting unwanted messages within an online service, in accordance with some embodiments.

FIG. 3 illustrates a signal diagram 300 of a technique for limiting unwanted messages within an online service. The signal diagram 300 includes a client device 352 (such as one of the client devices 152 discussed with respect to FIG. 1) as well as various components of an analysis server: a communication module 354, a synchronous analysis module 304 (such as the synchronous analysis module 204 discussed with respect to FIG. 2), an asynchronous analysis module 308 (such as the asynchronous analysis module 208 discussed with respect to FIG. 2), storage 313 (such as the database 213 discussed with respect to FIG. 2), and a broadcast module 356. It should be appreciated that alternative, additional, or fewer components are envisioned.

The signal diagram 300 may begin when the client device 352 sends (371) a message that is received by the communication module 354 of the analysis server. The message may originate from a certain account within a social networking service. Further, the message may specify a destination account within the social networking service or may be intended for the "followers" or "connections" of the certain account. The communication module 354 ingests the message and provides (373) the message to the synchronous analysis module 304. The communication module 354 also provides (375) the message to the asynchronous analysis module 308 either concurrently with or before/after providing the message to the synchronous analysis module 304. The synchronous analysis module 304 may retrieve (377) a set of characteristics from the storage 313 for use with an associated analysis of the message. The asynchronous analysis module 308 may retrieve (381) a set of rules 381 from the storage 313 for use with another associated analysis of the message. As described herein, an analysis of the set of characteristics may be performed at a lower latency than an analysis of the set of rules.

The synchronous analysis module 304 may perform (379) a synchronous analysis on the message according to the retrieved set of characteristics to synchronously determine (383) whether the message has characteristics of spam. In some implementations, the synchronous analysis module 304 may calculate a message score for the message and compare the message score to one or more threshold levels to determine whether the message should be classified as spam. If the synchronous analysis module 304 determines that the message has characteristics of spam ("YES"), the synchronous analysis module 304 may optionally initiate a challenge (385) with the client device 352 via various countermeasures such as a further verification (e.g., a CAPTCHA). If the client device 352 does not complete the challenge, the synchronous analysis module 304 may block (387) the message or otherwise prevent the message from being broadcast within the social networking service. In some cases, the synchronous analysis module 304 may automatically block the message without initiating a challenge with the client device 352. The synchronous analysis module 304 may also update an event log with an indication of the action taken.

If the synchronous analysis module 304 determines that the message does not have characteristics of spam ("NO") or if the client device 352 successfully completes the challenge, the synchronous analysis module 304 may provide (389) the message to the broadcast module 356. Upon receipt of the message, the broadcast module 356 may broadcast (392) the message within the social networking service. In one example, the broadcast module 356 may broadcast the message to any "follower" or "connection" accounts of the originating account. In another example, if the message is a "mention" that originates from Account A and identifies one or more other accounts, (e.g., Account B), then then the broadcast module 356 may send a push notification to Account B as well as include the mention in an "activity" or "notification" section of Account B's timeline (which may require an additional spam check). In a further example, if the message corresponds to Account A newly "following" Account B, then the broadcast module 356 may create a new follow edge between Account A and Account B as well as send a notification of the follow to the activity or notification section of Account B's timeline (which may also require an additional spam check). Additionally, if the message corresponds to Account A establishing a placeholder account for a new user signing up for the service, then the broadcast module 356 may create a new account for that user.

The asynchronous analysis module 308 may perform (391) an asynchronous analysis of the message according to the retrieved set of rules to asynchronously determine (393) whether the message has characteristics of spam. In some implementations, the asynchronous analysis module 308 may calculate or modify a message score for the message and compare the message score to one or more threshold levels to determine whether the message should be classified as spam. It should be appreciated that the asynchronous analysis module 308 may perform the asynchronous analysis either concurrently with or before/after the synchronous analysis module 304 performs the synchronous analysis of the message in (379). Further, it should be appreciated that the asynchronous analysis module 308 may perform the asynchronous analysis concurrently with or before/after the broadcast module 356 broadcasts the message in (392), assuming that the message passed the synchronous analysis.

If the asynchronous analysis module 308 determines that the message does not have characteristics of spam ("NO"), then the signal diagram 300 may end or repeat any functionality (such as if a new message is received). In contrast, if the asynchronous analysis module 308 determines that the message has characteristics of spam ("YES"), the asynchronous analysis module 308 may notify (394) the broadcast module 356 of the spam. In response to receiving the notification, the broadcast module 356 may cause (395) the message to be removed from the social networking service (assuming that the broadcast module 356 has already broadcast the message). It should be appreciated that the analysis server may perform additional actions such as suspending the originating account and/or other actions.

The asynchronous analysis module 308 may further identify (396) a characteristic of the message that caused the positive spam determination in (393). Generally, the identified characteristic may be a characteristic that the synchronous analysis module 304 did not detect in the synchronous analysis in (379). After identifying the characteristic, the asynchronous analysis module 308 may provide (397) the identified characteristic to the storage 313, whereby the synchronous analysis module 304 may use the identified characteristic in subsequent synchronous analyses of additional messages. Processing of the signal diagram 300 may then end or return to any previous functionality.

Figure 4:
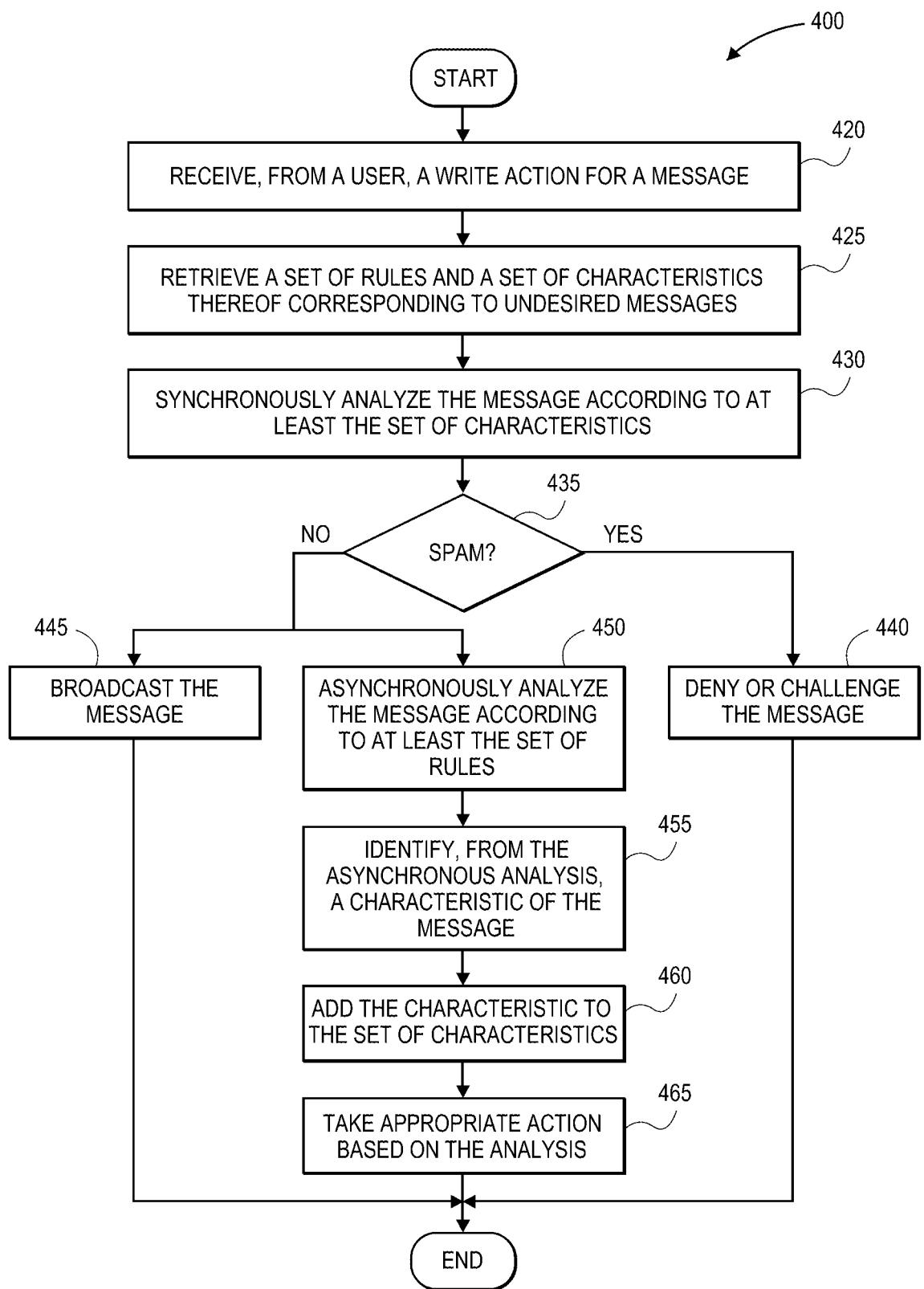
FIG. 4 depicts a flow diagram of a method for limiting unwanted messages within an online service, in accordance with some embodiments.

FIG. 4 illustrates a diagram of a method 400 of reducing unwanted messages or spam within an online service. The method 400 may be facilitated by a server (such as the analysis server 101 as described with respect to FIG. 1), or any combination or hardware and/or software components.

The method 400 begins with the server receiving (420), from a user of an online service via a client device of the user, a write action for a message. The write action may correspond to an account of the user attempting to publish or communicate the message within the social networking service. The server can retrieve (425), from a database or other storage, a set of rules and a set of characteristics thereof that correspond to undesired messages (i.e., spam). As discussed herein, the set of characteristics may include metrics or labels that may indicate undesired messages or may indicate that the account is attempting to broadcast undesired messages (e.g., one characteristic may be the number of times that the account has been "blocked" over a period of time).

The server may synchronously analyze (430) the message according to at least the set of characteristics. Because of the lower latency requirement of a synchronous analysis, the server may perform the analysis by examining the set of characteristics without examining a portion of the set of rules that have a higher latency requirement. In some embodiments, one or more of the set of rules may be analyzed under lower latency. The server may determine (435), based on the synchronous analysis, whether the message is spam. If the server determines that the message is spam ("YES"), the server may deny or challenge (440) the message. In particular, the server may prevent the message from being written to or published within the online service, or may provide the user account with a challenge (e.g., a CAPTCHA) to prove that the user is human. After the server denies or challenges the message, processing may end or proceed to other functionality. For example, if the user successfully completes the challenge, the server may broadcast the message within the online service. In some embodiments, the server may still perform an asynchronous analysis on the message even if the server denies or challenges the message after the synchronous analysis.

If the server does not determine that the message is spam ("NO"), the server may broadcast (445) the message within the online service, such that the message may be viewable on respective streams of other accounts who are connected to the user's account. In embodiments, the server may also add the message as well as any actions that resulted from the synchronous analysis to an event log or queue. In parallel with broadcasting the message, the server may also asynchronously analyze (450) the message according to at least the set of rules, such as some or all of the set of rules retrieved from the database in (425). Because the asynchronous analysis has an associated higher latency, the server may be afforded the ability to execute complex models or algorithms that are included in the set of rules. According to some embodiments, the server may perform the synchronous and asynchronous analyses in parallel.

In some cases, the server may identify (455), from the asynchronous analysis, a characteristic of the message. In particular, the characteristic may be a metric or label that may indicate that the message is undesired or may indicate that the user is generally attempting to write undesired messages. Accordingly, the server may add (460) the characteristic to the set of characteristics that may be used in the synchronous analysis. The server may take (465) appropriate action on the message and/or the user's account based on the synchronous and/or asynchronous analyses. For example, the server may suspend the account, reset the password of the account, deny the message, allow the message, delete or remove the message from the online service, or the like. In some cases, the server may complete (450), (455), and (460) before the server broadcasts the message in (445). Accordingly, if the server determines to restrict propagation of the message in (465), then the server is able to prevent the message from being broadcast (or otherwise simply does not broadcast the message).

Figure 5:
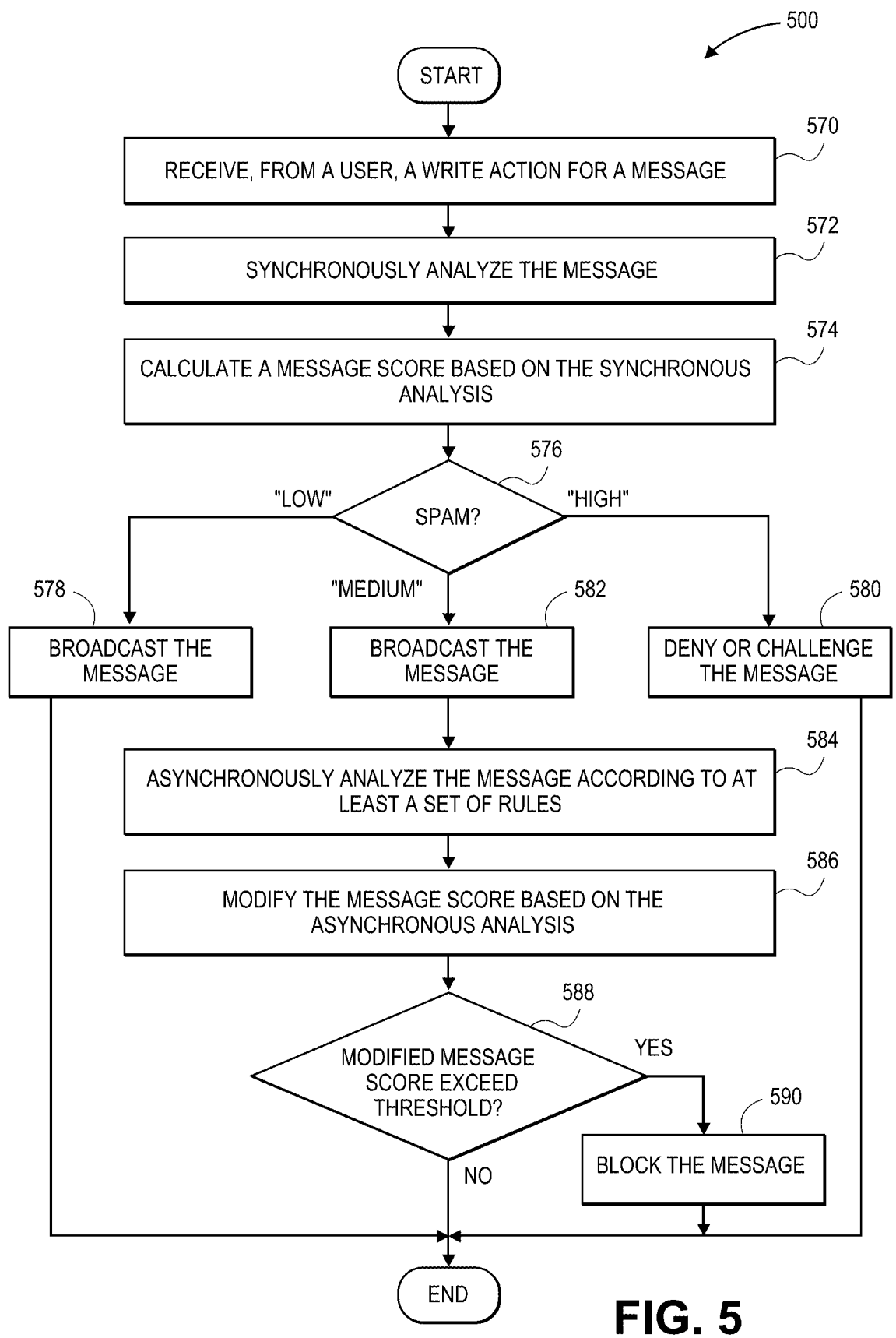
FIG. 5 depicts a flow diagram of an additional method for limiting unwanted messages within an online service, in accordance with some embodiments.

FIG. 5 illustrates a diagram of an additional method 500 of reducing unwanted messages or spam within an online service. The method 500 may be facilitated by a server (such as the analysis server 101 as described with respect to FIG. 1), or any combination or hardware and/or software components.

The method 500 begins with the server receiving (570), from a user of an online service via a client device of the user, a write action for a message. The write action may correspond to an account of the user attempting to broadcast the message within the social networking service. The server may synchronously analyze (572) the message according to at least a set of characteristics. In embodiments, the set of characteristics may be associated with a set of rules that correspond to undesired messages (i.e., spam), where the server may retrieve the set of characteristics and the set of rules from a database or other storage.

The server may calculate (574) a message score based on the synchronous analysis. The message score is an exemplary metric that may correspond to the chance or probability that the message is spam. For example, the message score can be on a scale from 0-100, with the higher the score corresponding to a higher probability of spam. The server may determine (576) a corresponding threshold level of the message score. In embodiments, there may be one or more threshold levels or ranges that respectively correspond to one or more different actions that the server may take with the message. Generally, the lesser the chance that the message is spam (i.e., the lower the message score), the lesser the need to perform an asynchronous analysis on the message (and vice-versa).

FIG. 5 illustrates three example threshold levels ("Low," "Medium," and "High") corresponding to different actions for the server to take with the message. If the message score is within the "Low" threshold level (e.g., 0-30), the server may broadcast (578) the message within the online service. After the server broadcasts the message, processing may end or proceed to other functionality. If the message score is within the "High" threshold level (e.g., 71-100), the server may outright deny or challenge (580) the message without performing an asynchronous analysis on the message. In particular, the server may prevent the message from being broadcast within the online service, or may provide the account with a challenge (e.g., a CAPTCHA) to prove that the user is human. After the server denies or challenges the message, processing may end or proceed to other functionality. If the message score is within the "Medium" threshold level (e.g., 31-70), the server may broadcast (582) the message within the online service. It should be appreciated that the server may update an event log to reflect the appropriate action taken resulting from the threshold level determination.

Further, if the message score is within the "Medium" threshold level, the server may asynchronously analyze (584) the message according to at least the set of rules, such as some or all of the set of rules retrieved from the database. According to embodiments, the server may initiate the asynchronous analysis in (584) either after or in parallel with broadcasting the message in 582. Because the asynchronous analysis has an associated higher latency, the server may be afforded the ability to execute complex models or algorithms that are included in the set of rules. In some embodiments, the server may identify one or more characteristics of the message that may be added to the database for use by the server in the synchronous analysis of (572).

The server may also modify (586) the message score of the message based on the asynchronous analysis. In particular, the server may refine the probability that the message is spam based on a result of the asynchronous analysis, which may be separate from the synchronous analysis. The server may decrease or increase the message score, or leave the message score unchanged. The server may determine (588) whether the modified message score exceeds a threshold value. Similar to the determination of (576), the higher the probability that the message is spam, the greater the need to block or deny the message. The threshold value of the determination in (588) may be the same as or different from any of the threshold levels of the determination in (576). For example, the threshold value of the determination in (588) may correspond to the "High" threshold level. Of course, it should be appreciated that any of the threshold levels and values may be configurable. If the modified message score does not exceed the threshold value ("NO"), processing may end or proceed to other functionality (i.e., the message remains broadcasted within the online service). If the modified message score does exceed the threshold value ("YES"), the server may block (590) the message, or otherwise remove or delete the message from the online service.

Figure 6:
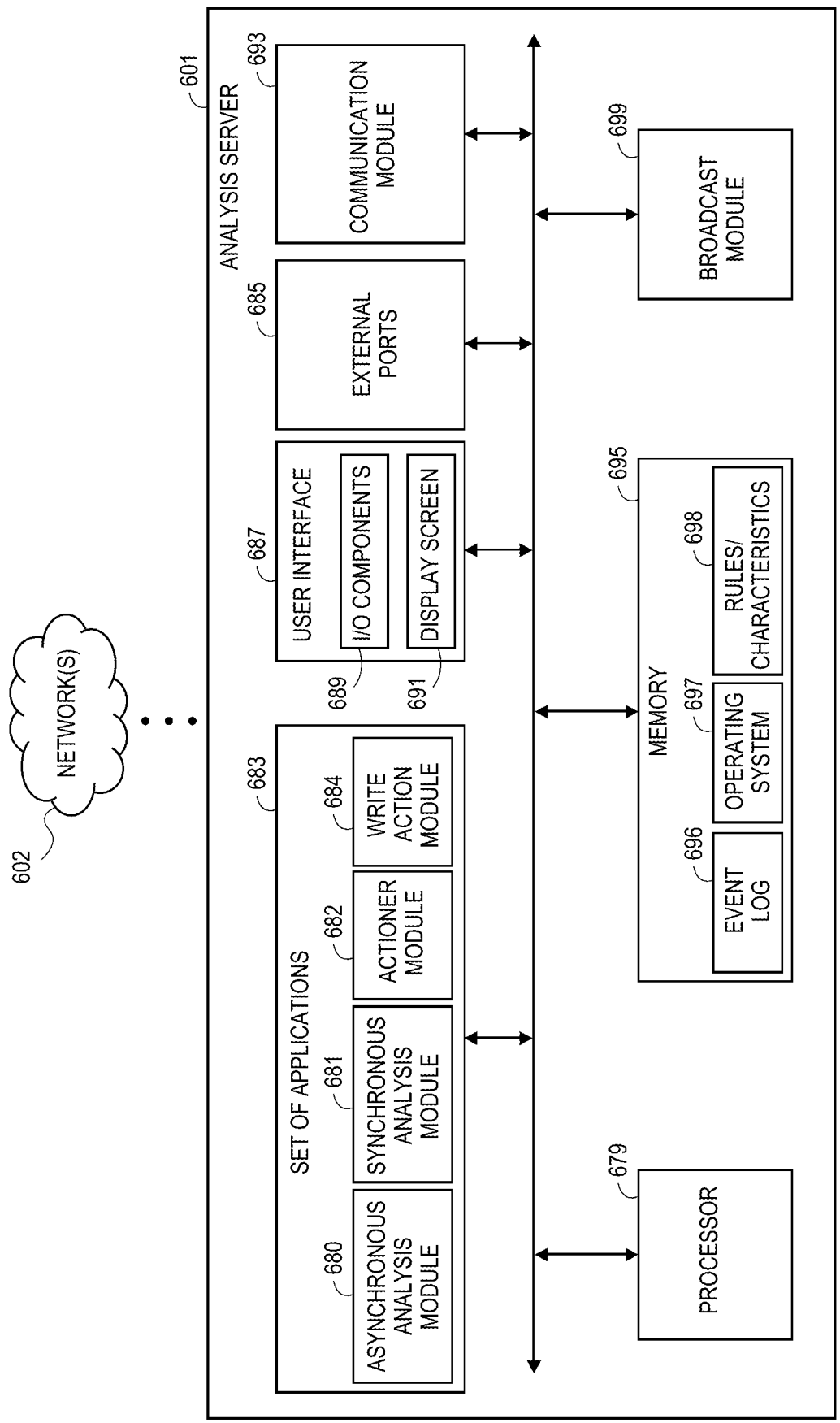
FIG. 6 depicts a server including various components configured to limit unwanted messages within an online service, in accordance with some embodiments.

FIG. 6 illustrates an analysis server 601 in which the functionalities as discussed herein may be implemented. In some embodiments, the analysis server 601 may be the analysis server as discussed with respect to FIGS. 1-3. Generally, the analysis server 601 is a dedicated computer machine, workstation, or the like, including any combination of hardware and software components.

The analysis server 601 can include a processor 679 or other similar type of controller module or microcontroller, as well as a memory 695. The memory 695 can store an operating system 697 capable of facilitating the functionalities as discussed herein. The processor 679 can interface with the memory 695 to execute the operating system 697 and a set of applications/modules 683. The set of applications/modules 683 (which the memory 695 can also store) can include an asynchronous analysis module 680 configured to perform asynchronous analyses on received messages and a synchronous analysis module 681 configured to perform synchronous analyses on received messages. The set of applications/modules 683 can also include an actioner module 682 configured to facilitate various actions based on the respective analyses of the synchronous analysis module 681 and the asynchronous analysis module 680, and a write action module 684 configured to receive a message from an external device via a network connection. It should be appreciated that the set of applications 683 can include one or more other applications or modules not depicted in FIG. 6.

Generally, the memory 695 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The analysis server 601 can further include a communication module 693 configured to interface with one or more external ports 685 to communicate data via one or more networks 602. For example, the communication module 693 can leverage the external ports 685 to receive messages and/or broadcast data via various wide area networks (WAN). According to some embodiments, the communication module 693 can include one or more transceivers functioning in accordance with IEEE standards, 3GPP standards, or other standards, and configured to receive and transmit data via the one or more external ports 685. More particularly, the communication module 693 can include one or more wireless or wired WAN and/or LAN transceivers configured to connect the analysis server 601 to WANs and/or LANs.

The analysis server 601 may further include a user interface 687 configured to present information to the user and/or receive inputs from the user. As illustrated in FIG. 6, the user interface 678 includes a display screen 691 and I/O components 689 (e.g., capacitive or resistive touch sensitive input panels, keys, buttons, lights, LEDs, cursor control devices, haptic devices, and others).

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 679 (e.g., working in connection with the operating system 697) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method comprising:
   receiving a first message from a user device for broadcast on a social networking service;
   in response to receiving the first message, performing synchronous analysis of the message to determine whether the message includes one or more specified characteristics indicative of undesirable content, wherein the synchronous analysis completes execution within a specified latency period required for broadcasting the message on the social networking service;
   calculating a first message score according to the synchronous analysis, wherein the first message score represents an initial likelihood that the first message contains undesirable content;
   determining whether the first message score indicates the first message contains undesirable content;
   after determining that the first message score indicates a likelihood that the first message contains undesirable content that is less than a first threshold indicating a high likelihood:
      broadcasting the first message to one or more recipient accounts on the social networking service, making the first message available for retrieval on the social networking service, and initiating asynchronous analysis of the first message,
      calculating a second message score according to the asynchronous analysis, and
      in response to determining that the second message score indicates the first message likely contains undesirable content, blocking the first message from retrieval on the social networking service.

2. The method of claim 1, further comprising:
   receiving a second message from another user device for broadcast on the social networking service;
   calculating a first message score for the second message according to the synchronous analysis;
   after determining that the first message score indicates a likelihood that the second message contains undesirable content less than a second threshold indicating a low likelihood:
      broadcasting the second message to one or more recipient accounts on the social networking service, making the second message available for retrieval on the social networking service without initiating asynchronous analysis of the second message.

3. The method of claim 1, further comprising:
   receiving a second message from another user device for broadcast on the social networking service;
   calculating a first message score for the second message according to the synchronous analysis;
   after determining that the first message score indicates a likelihood that the second message contains undesirable content greater than the first threshold indicating a high likelihood:
      blocking or challenging the message without performing asynchronous analysis on the second message.

4. The method of claim 1, further comprising:
   receiving a second message from another user device for broadcast on the social networking service;
   calculating a first message score for the second message according to the synchronous analysis;
   after determining that the first message score indicates a likelihood that the second message contains undesirable content greater than the first threshold indicating a high likelihood:
      blocking or challenging the message and initiating asynchronous analysis of the first message,
      calculating a second message score according to the asynchronous analysis, and
      in response to determining that the second message score indicates the first message likely contains undesirable content, updating the synchronous analysis with one or more characteristics identified by the asynchronous analysis for use in subsequent synchronous analysis of received messages.

5. The method of claim 1, further comprising:
   receiving a second message from another user device for broadcast on the social networking service;
   calculating a first message score for the second message according to the synchronous analysis;
   after determining that the first message score indicates a likelihood that the second message contains undesirable content that is less than the first threshold indicating a high likelihood:
      broadcasting the second message to one or more recipient accounts on the social networking service, making the second message available for retrieval on the social networking service, and initiating asynchronous analysis of the second message,
      calculating a second message score according to the asynchronous analysis, and
      in response to determining that the second message score indicates the second message has a likelihood of containing undesirable content less than a threshold indicating a low likelihood, take no further action with respect to the second message.

6. The method of claim 1, wherein,
   performing synchronous analysis comprises retrieving a set of rules, wherein each rule is associated with one or more characteristics, and applying one or more of the retrieved rules to the message; and
   performing asynchronous analysis comprise analyzing the message according to one or more machine learning models that that execute at a higher latency than the specified latency period.

7. The method of claim 1, further comprising:
   updating the synchronous analysis based on results of the asynchronous analysis to add one or more additional characteristics identified by the asynchronous analysis for use when calculating the first message score during synchronous analysis of subsequently received messages.

8. A system comprising:
   one or more computers and one or more storage devices storing instructions that are operable, when executed by the one or more computers, to cause the one or more computers to perform operations comprising:

receiving a first message from a user device for broadcast on a social networking service;

in response to receiving the first message, performing synchronous analysis of the message to determine whether the message includes one or more specified characteristics indicative of undesirable content, wherein the synchronous analysis completes execution within a specified latency period required for broadcasting the message on the social networking service;

calculating a first message score according to the synchronous analysis, wherein the first message score represents an initial likelihood that the first message contains undesirable content;

determining whether the first message score indicates the first message contains undesirable content;

after determining that the first message score indicates a likelihood that the first message contains undesirable content that is less than a first threshold indicating a high likelihood:

broadcasting the first message to one or more recipient accounts on the social networking service, making the first message available for retrieval on the social networking service, and initiating asynchronous analysis of the first message, calculating a second message score according to the asynchronous analysis, and in response to determining that the second message score indicates the first message likely contains undesirable content, blocking the first message from retrieval on the social networking service.

9. The system of claim 8, wherein the one or more storage devices further store instruction operable to cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content less than a second threshold indicating a low likelihood:

broadcasting the second message to one or more recipient accounts on the social networking service, making the second message available for retrieval on the social networking service without initiating asynchronous analysis of the second message.

10. The system of claim 8, wherein the one or more storage devices further store instruction operable to cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content greater than the first threshold indicating a high likelihood:

blocking or challenging the message without performing asynchronous analysis on the second message.

11. The system of claim 8, wherein the one or more storage devices further store instruction operable to cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content greater than the first threshold indicating a high likelihood:

blocking or challenging the message and initiating asynchronous analysis of the first message, calculating a second message score according to the asynchronous analysis, and in response to determining that the second message score indicates the first message likely contains undesirable content, updating the synchronous analysis with one or more characteristics identified by the asynchronous analysis for use in subsequent synchronous analysis of received messages.

12. The system of claim 8, wherein the one or more storage devices further store instruction operable to cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content that is less than the first threshold indicating a high likelihood:

broadcasting the second message to one or more recipient accounts on the social networking service, making the second message available for retrieval on the social networking service, and initiating asynchronous analysis of the second message, calculating a second message score according to the asynchronous analysis, and in response to determining that the second message score indicates the second message has a likelihood of containing undesirable content less than a threshold indicating a low likelihood, take no further action with respect to the second message.

13. The system of claim 8, wherein, performing synchronous analysis comprises retrieving a set of rules, wherein each rule is associated with one or more characteristics, and applying one or more of the retrieved rules to the message; and performing asynchronous analysis comprise analyzing the message according to one or more machine learning models that that execute at a higher latency than the specified latency period.

14. The system of claim 8, wherein the one or more storage devices further store instruction operable to cause the one or more computers to perform operations comprising:

updating the synchronous analysis based on results of the asynchronous analysis to add one or more additional characteristics identified by the asynchronous analysis for use when calculating the first message score during synchronous analysis of subsequently received messages.

15. One or more non-transitory computer storage media encoded with computer program instructions that when executed by one or more computers cause the one or more computers to perform operations comprising:

receiving a first message from a user device for broadcast on a social networking service;

in response to receiving the first message, performing synchronous analysis of the message to determine whether the message includes one or more specified characteristics indicative of undesirable content, wherein the synchronous analysis completes execution within a specified latency period required for broadcasting the message on the social networking service;

calculating a first message score according to the synchronous analysis, wherein the first message score represents an initial likelihood that the first message contains undesirable content;

determining whether the first message score indicates the first message contains undesirable content;

after determining that the first message score indicates a likelihood that the first message contains undesirable content that is less than a first threshold indicating a high likelihood:

broadcasting the first message to one or more recipient accounts on the social networking service, making the first message available for retrieval on the social networking service, and initiating asynchronous analysis of the first message, calculating a second message score according to the asynchronous analysis, and in response to determining that the second message score indicates the first message likely contains undesirable content, blocking the first message from retrieval on the social networking service.

16. The one or more non-transitory computer storage media of claim 15, further comprising instructions that when executed by the one or more computers cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content less than a second threshold indicating a low likelihood:

broadcasting the second message to one or more recipient accounts on the social networking service, making the second message available for retrieval on the social networking service without initiating asynchronous analysis of the second message.

17. The one or more non-transitory computer storage media of claim 15, further comprising instructions that when executed by the one or more computers cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content greater than the first threshold indicating a high likelihood:

blocking or challenging the message without performing asynchronous analysis on the second message.

18. The one or more non-transitory computer storage media of claim 15, further comprising instructions that when executed by the one or more computers cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content greater than the first threshold indicating a high likelihood:

blocking or challenging the message and initiating asynchronous analysis of the first message, calculating a second message score according to the asynchronous analysis, and in response to determining that the second message score indicates the first message likely contains undesirable content, updating the synchronous analysis with one or more characteristics identified by the asynchronous analysis for use in subsequent synchronous analysis of received messages.

19. The one or more non-transitory computer storage media of claim 15, further comprising instructions that when executed by the one or more computers cause the one or more computers to perform operations comprising:

receiving a second message from another user device for broadcast on the social networking service;

calculating a first message score for the second message according to the synchronous analysis;

after determining that the first message score indicates a likelihood that the second message contains undesirable content that is less than the first threshold indicating a high likelihood:

broadcasting the second message to one or more recipient accounts on the social networking service, making the second message available for retrieval on the social networking service, and initiating asynchronous analysis of the second message, calculating a second message score according to the asynchronous analysis, and in response to determining that the second message score indicates the second message has a likelihood of containing undesirable content less than a threshold indicating a low likelihood, take no further action with respect to the second message.

20. The one or more non-transitory computer storage media of claim 15, wherein, performing synchronous analysis comprises retrieving a set of rules, wherein each rule is associated with one or more characteristics, and applying one or more of the retrieved rules to the message; and performing asynchronous analysis comprise analyzing the message according to one or more machine learning models that that execute at a higher latency than the specified latency period.

21. The one or more non-transitory computer storage media of claim 15, further comprising instructions that when executed by the one or more computers cause the one or more computers to perform operations comprising:

updating the synchronous analysis based on results of the asynchronous analysis to add one or more additional characteristics identified by the asynchronous analysis for use when calculating the first message score during synchronous analysis of subsequently received messages.

* * * * *